July 27, 1965  O. W. SMITH  3,197,237

DETACHABLE PUSHABLE AXLE

Filed Nov. 20, 1961  3 Sheets-Sheet 1

INVENTOR.
OTHO W. SMITH
BY
Kimmel & Crowell
ATTORNEYS.

INVENTOR.
OTHO W. SMITH
BY Kimmel & Crowell
ATTORNEYS.

INVENTOR.
OTHO W. SMITH
BY Kimmel & Crowell
ATTORNEYS.

United States Patent Office 3,197,237
Patented July 27, 1965

3,197,237
DETACHABLE PUSHABLE AXLE
Otho W. Smith, 33 Oolitic Road, Bedford, Ind.
Filed Nov. 20, 1961, Ser. No. 153,595
5 Claims. (Cl. 280—415)

This invention relates to a detachable pushable axle and has particular applicability to such an axle for use with tractor-trailer combination vehicles.

A primary object of this invention is the provision of an improved supplemental detachable axle which is positioned between the front and rear wheels of the tractor whereby an additional or heavy load may be carried by the trailer without material increase in the overall length of the vehicle or in the height thereof.

A further object of the invention is the provision of a device of this character provided with means whereby the intermediately positioned axle and its associated wheels may be raised when the load is removed therefrom so as to be out of contact with the ground when the tractor is traveling alone, for example.

A further object of the invention is the provision of a device of this character wherein the axle and its associated wheels are maintained in positive longitudinal alignment with the vehicle, but wherein a slight rocking movement is permitted laterally of the vehicle in order that the wheels may more readily follow the contour of the road when in engagement therewith.

Still another object of the invention is the provision of a device of this character which may be readily attached to or detached from the tractor with a minimum of time, effort, and difficulty.

A further more specific object of the invention is the provision of a detachable pushable axle of this character provided with means whereby the same may be mounted over the lugs normally supporting the fifth wheel of a tractor after removal of the fifth wheel therefrom, the device itself carrying an auxiliary fifth wheel to which the trailer may be readily attached.

A still further object of the invention is the provision of such a detachable pushable axle which is sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter and disclosed in the accompanying drawings wherein there is shown a preferred embodiment of the instant invention.

In the drawings.

Similar reference characters refer to similar parts throughout the several views of the drawings.

Figure 5:
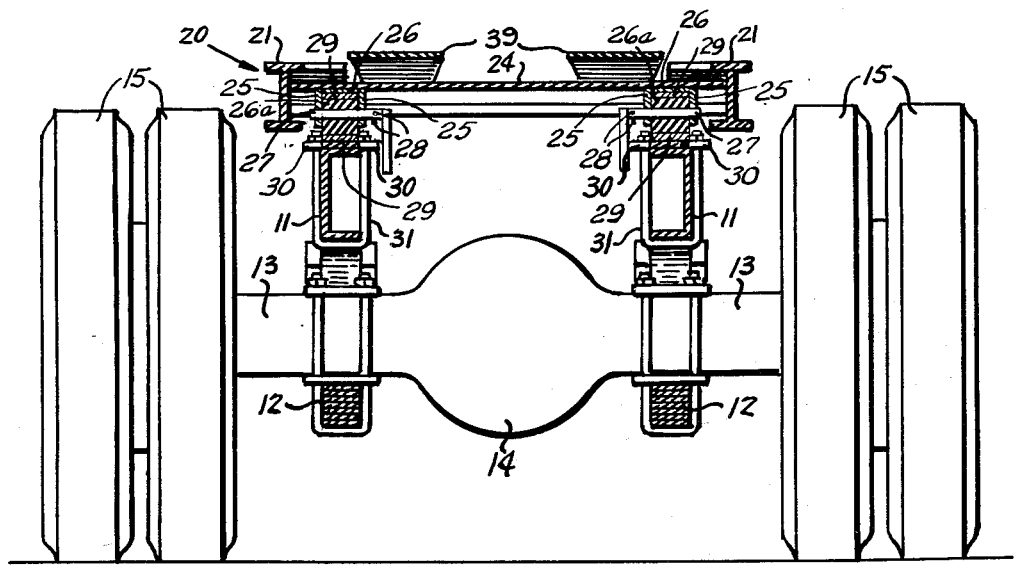
FIGURE 5 is a secional view taken substantially along the line 5—5 of FIG. 2 as viewed in the direction indicated by the arrows.
Figure 6:
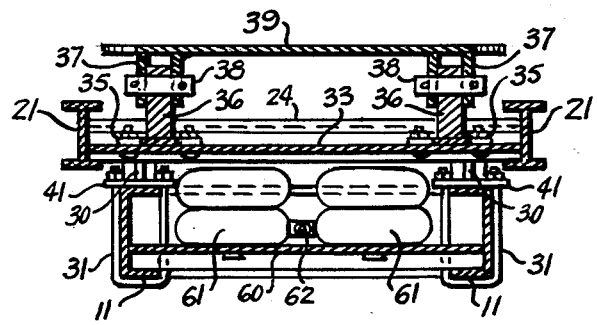
FIGURE 6 is a sectional view taken substantially along the line 6—6 of FIG. 2 as viewed in the direction indicated by the arrows.
Figure 7:
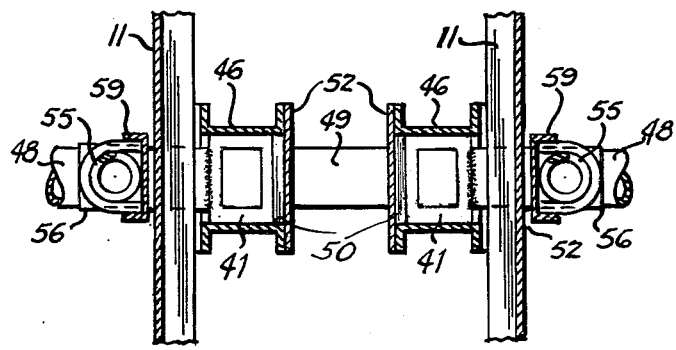
FIGURE 7 is a sectional view taken substantially along the line 7—7 of FIG. 4 as viewed in the direction indicated by the arrows.

Having reference now to the drawings in detail, there is generally indicated at 10 the rear portion of a truck or tractor vehicle which comprises two longitudinally extending channel irons 11 comprising integral and conventional portions of the vehicle frame which are mounted in the usual manner on springs 12 and a conventional rear axle 13 embodying a transmission 14 (see FIG. 5). The rear axle 13 carries the conventional drive wheels 15 in the usual manner. The customary or conventional fifth wheel of the vehicle (not shown) is mounted on a transverse plate 17 extending between the beams or irons 11. When it is desired to employ the device of the instant invention, the conventional fifth wheel is removed, but this constitutes the only alteration of the conventional truck or trailer body, there being no necessity for adjusting or altering springs or any other part of the body.

The device of the instant invention is generally indicated at 20 and comprises a pair of spaced longitudinally extending I beams 21 which are tapered at their front and rear as indicated at 22 and 23, respectively.

An inverted channel iron 24 extends transversely between the beams and extends over the conventional fifth wheel mounting swivel, and carries on its underside a pair of inverted U-shaped housings 25 which contain external bearing members 26 through which extend pivots 27, held in position by locking pins 28. The internal bearing members 29 are secured to plates 30 having flanges 41 which are in turn secured by U bolts 31 about the channel-shaped frame members 11 of the vehicle. Rubber bushings 26a are disposed within members 29.

An I beam 32 extends transversely between the longitudinally extending frame portions 21, and a plate 33 is rigidly affixed as by means of a welded flange 34 to the pivotally mounted channel member 24. The plate 33 carries a plate 35 securely bolted thereto, the latter plate carrying pairs of upstanding lugs 36 between which are mounted depending lugs 37 on pivots 38, the lugs 37 carrying a conventional bifurcated fifth wheel structure 39.

The forward end of plate 33 is secured to a bolster 45 which extends transversely across the frame and carries a pair of depending rectangular guides 46 which extend downwardly between the frame members 11, and which serve as guides for axle supporting members 47, a bent axle 48 having a central depression 49 extending transversely through the lower ends thereof and having fixedly secured thereto the members 47. The upper portion of each member 47 is provided with a transversely extending bulbous portion 50 so that tilting of the axle 48 laterally to a limited degree is permitted thus allowing the auxiliary wheels 51 carried by the axle 48 readily to accommodate to the contour of the roadway in order that all wheels are on the ground at all times. Wear plates 52 are provided at points of maximum stress.

Spring mounting of the auxiliary wheels is effected by heavy duty compression springs 55 which at their lower extremities are mounted on plates 56 carried by the axle 48, and which at their upper end seat in cup-like housings 57 which are provided internally with rubber cushioning blocks 58 which are carried by channel members 59 secured to the ends of bolster 45.

Figure 1:
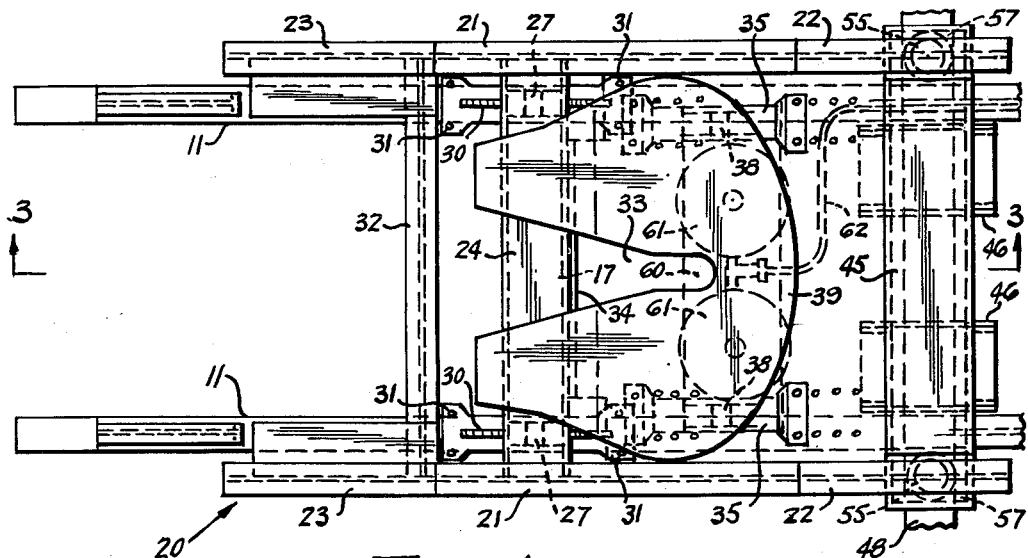
FIGURE 1 is a top plan view of the detachable pushable axle of the instant invention shown as applied to a truck frame, certain concealed parts thereof being indicated in dotted lines.
Figure 2:
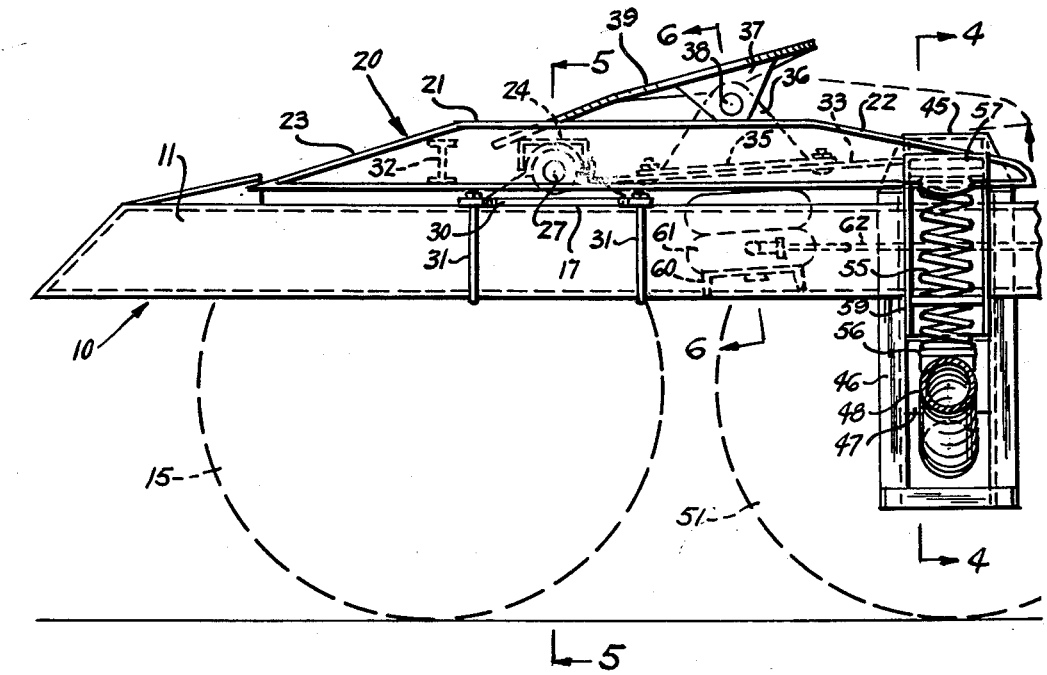
FIGURE 2 is a side elevational view of the device of the instant invention, partially in section, certain concealed portions thereof being indicated in dotted lines.
Figure 3:
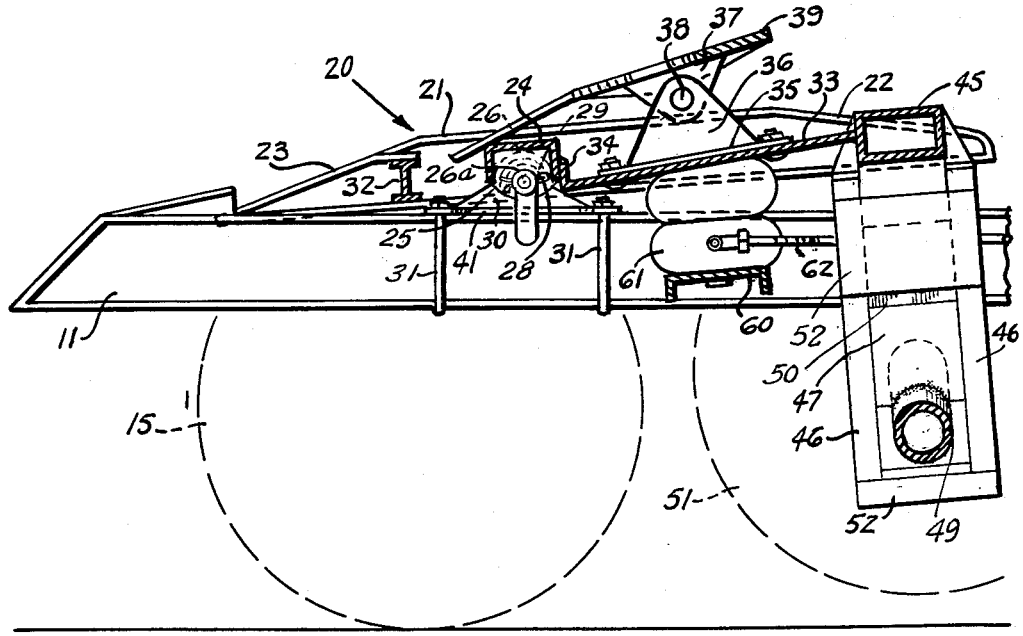
FIGURE 3 is a sectional view taken substantially along the line 3—3 of FIG. 1 as viewed in the direction indicated by the arrows.
Figure 4:
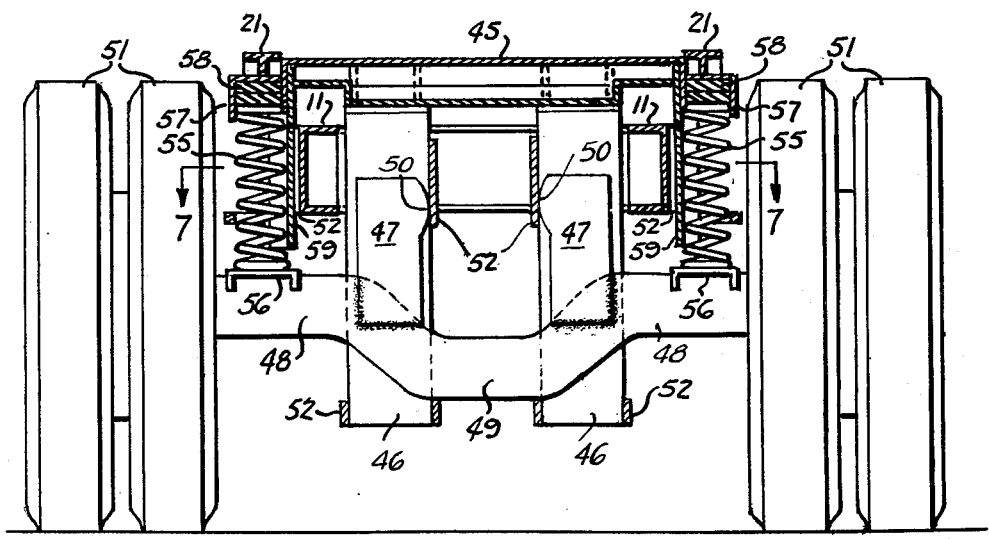
FIGURE 4 is a sectional view taken substantially along the line 4—4 of FIG. 2 as viewed in the direction indicated by the arrows.

A transverse plate 60 extending between the frame members 11 carries a pair of rubber diaphragms 61 which are supplied when desired with compressed air through a line 62 which extends to a suitable control in the cab of the tractor vehicle. The air pressure in the diaphragms 61 is normally insufficient to provide anything other than a cushioning action when a trailer is attached to the fifth wheel 39. However, when the tractor is traveling without a load, inflation of the diaphragms 61 may, if desired, tilt the plate 39 to the position shown in FIG. 3, and there being no load thereon, elevate the wheels 51 out of contact with the road surface.

Obviously, when desired the assembly may be removed merely by detaching the bolts 31 and removing the pivot pins 27, at which time a conventional fifth wheel assembly may be repositioned on the tractor frame.

From the foregoing it will now be seen that there is herein provided an improved detachable pushable axle arrangement which may be employed by virtue of the positioning of the auxiliary wheels between the front and rear wheels of the tractor vehicle to carry a materially increased load without increasing to any extent the length or height of the overall tractor-trailer combination.

It will also be seen that there is herein provided a detachable auxiliary axle unit which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A detachable pushable axle for tractor vehicles having front and rear wheels adapted to permit an increase in the permissible load carried by a trailer attached to the vehicle without increase in height or length of the tractor-trailer assembly, comprising a frame including a pair of longitudinally extending beams adapted to be secured to the tractor frame members after removal of the fifth wheel of the tractor, a transverse plate extending between said beams, a channel member secured to said plate adapted to be pivotally mounted on the fifth wheel mounting of the tractor, a fifth wheel carried by said plate, vertical guide members carried by said plate at its free end, guide shoes in said guide members, a pushable axle carried by said guide shoes, wheels carried by said pushable axle to be positioned between said front and rear wheels of said tractor vehicle, and spring means positioned between said pushable axle and said beams adjacent said guide members, said guide shoes being arcuate on their transverse sides to permit lateral play of said axle in conformity to the road bed, rubber diaphragms positioned between said plate and a fixed portion of the tractor vehicle frame, and means for inflating said diphragms with compressed air for lifting said plate and raising said pushable axle and its associated wheels from contact with the road bed.

2. A tractor vehicle including a frame having side members, front and rear axles supported by said frame, and a pushable axle adapted to permit an increase in the permissible load carried by a trailer attached to the vehicle without increase in height or length of the tractor-trailer assembly, said pushable axle including a longitudinally extending frame, pivot means attachable to each side member of said vehicle frame for mounting the axle frame to the vehicle frame adjacent the rear end of the vehicle frame, said axle frame extending forwardly of the rear axle of said vehicle, axle support means including laterally spaced members extending downwardly from the axle frame adjacent the forward end of said axle frame, a wheel bearing axle, means for mounting said wheel bearing axle to said axle support means, and a fifth wheel mounted on said axle forwardly of said pivot means.

3. A tractor vehicle and pushable axle as described in claim 2 wherein there is provided an adjustable lifting mechanism on said tractor frame forwardly of said pivot means and operably connected to said axle frame for elevating the forward end of said axle frame.

4. A tractor vehicle including a frame having side members, front and rear axles supported by said frame, and a demountable pushable axle adapted to permit an increase in the permissible load carried by a trailer attached to the vehicle without increase in height or length of the tractor-trailer assembly, said pushable axle including a frame having side members, pivot means removably attachable to said vehicle frame for mounting each side member of the axle frame to a corresponding side member of the vehicle frame adjacent the rear end of said vehicle frame, said axle frame extending forwardly of the rear axle of said vehicle, axle support means extending downwardly from each side member of the axle frame adjacent the forward end of said axle frame, a wheel bearing axle, means for movably mounting said wheel bearing axle to said axle support means, and a fifth wheel mounted on said axle frame forwardly of said pivot means.

5. A tractor vehicle including a frame having side members, front and rear axles supported by said frame, and a pushable axle adapted to permit an increase in the permissible load carried by a trailer attached to the vehicle without increase in height or length of the tractor-trailer assembly, said pushable axle including a longitudinally extending frame, pivot means attachable to each side member of said vehicle frame for mounting the axle frame to the vehicle frame adjacent the rear end of the vehicle frame, said axle frame extending forwardly of the rear axle of said vehicle, axle support means including laterally spaced members extending downwardly from the axle frame adjacent the forward ends of the axle frame, a wheel bearing axle, means for mounting said wheel bearing axle to said axle support means, a fifth wheel mounted on said axle forwardly of said pivot means, and an adjustable lifting mechanism on said tractor frame forwardly of said pivot means and operably connected to said axle frame for elevating the forward end of said axle frame.

References Cited by the Examiner

UNITED STATES PATENTS

| 2,126,819 | 8/38 | Schawlem. | |
|---|---|---|---|
| 2,682,420 | 7/54 | Chelf | 280—423 X |
| 2,698,668 | 1/55 | McKay. | |
| 2,776,846 | 1/57 | Willock | 280—423 X |
| 2,782,051 | 2/57 | Smith. | |
| 2,816,776 | 12/57 | Nimtz | 280—423 |
| 2,947,547 | 8/60 | Gouirand. | |

BENJAMIN HERSH, *Primary Examiner.*

LEO FRIAGLIA, PHILLIP ARNOLD,
A. HARRY LEVY, *Examiners.*